(12) United States Patent
Alavie et al.

(10) Patent No.: US 6,310,703 B1
(45) Date of Patent: Oct. 30, 2001

(54) METHOD AND APPARATUS FOR OPTICAL PERFORMANCE MONITORING IN WAVELENGTH DIVISION MULTIPLEXED FIBER OPTICAL SYSTEMS

(75) Inventors: A. Tino Alavie, Richmond Hill; Ming Gang Xu, Don Mills, both of (CA)

(73) Assignee: JDS Uniphase Corporation, San Jose, CA (US)

( * ) Notice: Subject to any disclaimer, the term of this patent is extended or adjusted under 35 U.S.C. 154(b) by 0 days.

(21) Appl. No.: 09/384,224

(22) Filed: Aug. 27, 1999

Related U.S. Application Data
(60) Provisional application No. 60/098,382, filed on Aug. 28, 1998.

(51) Int. Cl.[7] .............................. H04B 10/08; H04J 14/02
(52) U.S. Cl. ......................... 359/110; 359/124; 359/128
(58) Field of Search ................................ 359/110, 124, 359/130, 187

(56) References Cited

U.S. PATENT DOCUMENTS

| | | | |
|---|---|---|---|
| 4,852,079 | * 7/1989 | Kinney et al. | 370/3 |
| 5,387,992 | * 2/1995 | Miyazaki et al. | 359/124 |
| 5,696,863 | * 12/1997 | Kleinerman | 385/123 |
| 5,747,791 | 5/1998 | Coroy | 250/214 R |
| 5,861,980 | * 1/1999 | Ono | 359/341 |
| 5,995,255 | * 11/1999 | Giles | 359/124 |
| 6,067,288 | * 5/2000 | Miller et al. | 370/242 |

FOREIGN PATENT DOCUMENTS

| | | |
|---|---|---|
| 0455461 | 11/1991 | (EP) . |
| 07626672 | 3/1997 | (EP) . |

* cited by examiner

*Primary Examiner*—Jason Chan
*Assistant Examiner*—Christina Y. Leung
(74) *Attorney, Agent, or Firm*—Neil Teitelbaum (57) ABSTRACT

The method and apparatus forming the present invention allows for rapid analysis of the optical spectrum and its content by controlling the spectral position of a channel select element and using a ratiometric wavelength and power determination technique to accurately analyze the transmitted or elected portion of the optical spectrum. The channel select element can be either a transmissive or reflective device which can be tuned by way of a control signal. The system can be operated in either scan and post process mode or in a continuous feedback mode where the position of the channel select element is determined by the ratiometric wavelength determination system and used to control the wavelength position of the channel select element. The ratiometric wavelength and power determination system, in its typical form, is based on dividing the spectrally encoded optical signal into two parts. One part of this signal passes through an optical filter with continuously increasing or decreasing transmission as a function of wavelength while the other part is unperturbed. The two parts and subsequently detected by optical to electrical detectors where the electrical signal is proportional to the optical signal. Dividing the two signals reveals a unique number which is a power independent representation of the input wavelength. The present invention advantageously provides a method and device to measure simultaneously several carriers and not just one. Furthermore, in the present invention, a power measurement is obtained by using the unfiltered part of the optical signal.

22 Claims, 10 Drawing Sheets

METHOD AND APPARATUS FOR OPTICAL PERFORMANCE MONITORING IN WAVELENGTH DIVISION MULTIPLEXED FIBER OPTICAL SYSTEMS

CROSS REFERENCE TO RELATED U.S. PATENT APPLICATION

This patent application relates to United States Provisional Patent Application Serial No. 60/098,382 filed on Aug. 28, 1998, entitled METHOD AND APPARATUS FOR OPTICAL PERFORMANCE MONITORING IN WAVELENGTH DIVISION MULTIPLEXED FIBER OPTICAL SYSTEMS.

FIELD OF THE INVENTION

The present invention relates to a method and apparatus for optical spectrum analysis in wavelength division multiplexed fiber optic systems.

BACKGROUND OF THE INVENTION

Wavelength division multiplexing is one way in which the information capacity, bandwidth, of an optical fiber can be substantially increased. This is accomplished by using several optical carriers within a narrow spectrum, typically around 1550 nm, which individually carry information in the optical fiber. In such systems, the information is encoded onto each carrier. The carriers are then combined through an optical multiplexer which then permits simultaneous transmission of all carriers into the optical fiber. At the receiving end, the optical signals are passed through an optical demultiplexer which subsequently routes the individual carriers to their appropriate channel. The present invention relates to the measurement of optical parameters for individual carriers in a wavelength division multiplexed fiber optic system. In such systems, measurement of optical parameters on a per carrier basis are critical as they provide vital information regarding both the heath of the optical networks over which such systems operate in addition to the performance of the system. Such information can then be used for diagnosis and repair or for performance optimization actions.

The optical information sought can usually be determined by the measurement of wavelength, power, and optical signal-to-noise ratio all measured on a per carrier basis. The measurement of such parameters must be accurate, have a wide range, and be performed in a timely manner so as to provide the necessary information in the shortest amount of time for the appropriate actions.

The conventional approach to analyzing the optical parameters of a spectrally dependent system is to use an optical spectrum analyzer. These systems are generally based on using an optical tool known as a monochromater. Monochromater based optical spectrum analyzers are typically slow, large in size for most embedded and field applications, and tend to drift with time, giving poor absolute accuracy. In fact, for most applications more than one instrument is typically used to obtain key optical parameters such as those described above.

Accordingly it would be advantageous to provide a ratiometric wavelength and power detection system that accurately provides wavelength, power, and signal-to-noise ratio measurements on a per carrier basis. Further, it would be advantageous if such a system could be provided in situ to provide these measurements so that the information could be monitored on a continual basis. Alternatively it would be advantageous if such a system could be used as a stand alone diagnostic tool.

SUMMARY OF THE INVENTION

It is an object of the present invention to provide a method and devices for analyzing an optical spectrum in wavelength division multiplexed fiber optic systems that provides wavelength, power, and signal-to-noise ratio measurements on a per carrier basis.

The present invention provides an apparatus for analyzing an optical spectrum in wavelength division multiplexed fiber optic systems, comprising:

a tunable channel selector having an input and an output;

a wavelength and power detection system optically connected to the output of the tunable channel selector; and a controller connected to the tunable channel selector and the wavelength and power detection system.

The present invention also provides a ratiometric method of analyzing an optical spectrum in wavelength division multiplexed fiber optic systems, comprising:

receiving a spectrally encoded optical signal into a tunable channel selector;

dividing the spectrally encoded optical signal into at least two optical signals and passing a first optical signal through an optical filter;

detecting an output of the optical filter and converting the detected optical signal to a first electrical signal and detecting a second optical signal from the divided optical signal and converting it to a second electrical signal; and dividing one of the electrical signals by the other electrical signal to give a power independent representation of an input wavelength.

The method and apparatus forming the present invention allows for rapid analysis of the optical spectrum and its content by controlling the spectral position of a channel select element and using a ratiometric wavelength and power determination technique to accurately analyze the transmitted or selected portion of the optical spectrum. The channel select element may be either a transmissive or reflective device which may be tuned by way of a control signal. The system can be operated in either scan and post process mode or in a continuous feedback mode where the position of the channel select element is determined by the ratiometric wavelength determination system and used to control the wavelength position of the channel select element. This ratiometric wavelength and power determination system, in its typical form, is based on dividing the spectrally encoded optical signal into two parts. One part of this signal passes through an optical filter with continuously increasing or decreasing transmission as a function of wavelength while the other part is unperturbed. The two parts are subsequently detected by optical to electrical detectors where the electrical signal is proportional to the optical signal. Ratioing the two signals reveals a unique number which is a power independent representation of the input wavelength. The present invention advantageously provides a method and device to measure simultaneously several carriers and not just one. Furthermore, in the present invention, a power measurement may be obtained by using the unfiltered part of the optical signal.

BRIEF DESCRIPTION OF THE DRAWINGS

The method and apparatus for optical performance monitoring in wavelength division multiplexed fiber optic systems forming the present invention will now be described, by example only, reference being had to the accompanying drawings, in which.

DETAILED DESCRIPTION OF THE INVENTION

The present invention embodies the use of a channel select filter together with a ratiometric wavelength and power determination system to accurately provide wavelength, power, and signal-to-noise ratio measurements on a per carrier basis. The system of the present invention can all be accomplished in a lightweight and compact enclosure making it possible to use such system in an embeddable form within fiber optic transmission systems. Alternatively, the system of the present invention can be used as a stand-alone diagnostics tool for both field and laboratory use.

The method and apparatus forming the present invention allows for rapid analysis of the optical spectrum and its content by controlling the spectral position of a channel select element and using a ratiometric wavelength and power determination technique to accurately analyze the transmitted or elected portion of the optical spectrum. The channel select element can be either a transmissive or reflective device which can be tuned by way of a control signal. The system can be operated in either scan and post process mode or in a continuous feedback mode where the position of the channel select element is determined by the ratiometric wavelength determination system and used to control the wavelength position of the channel select element.

Figure 1:
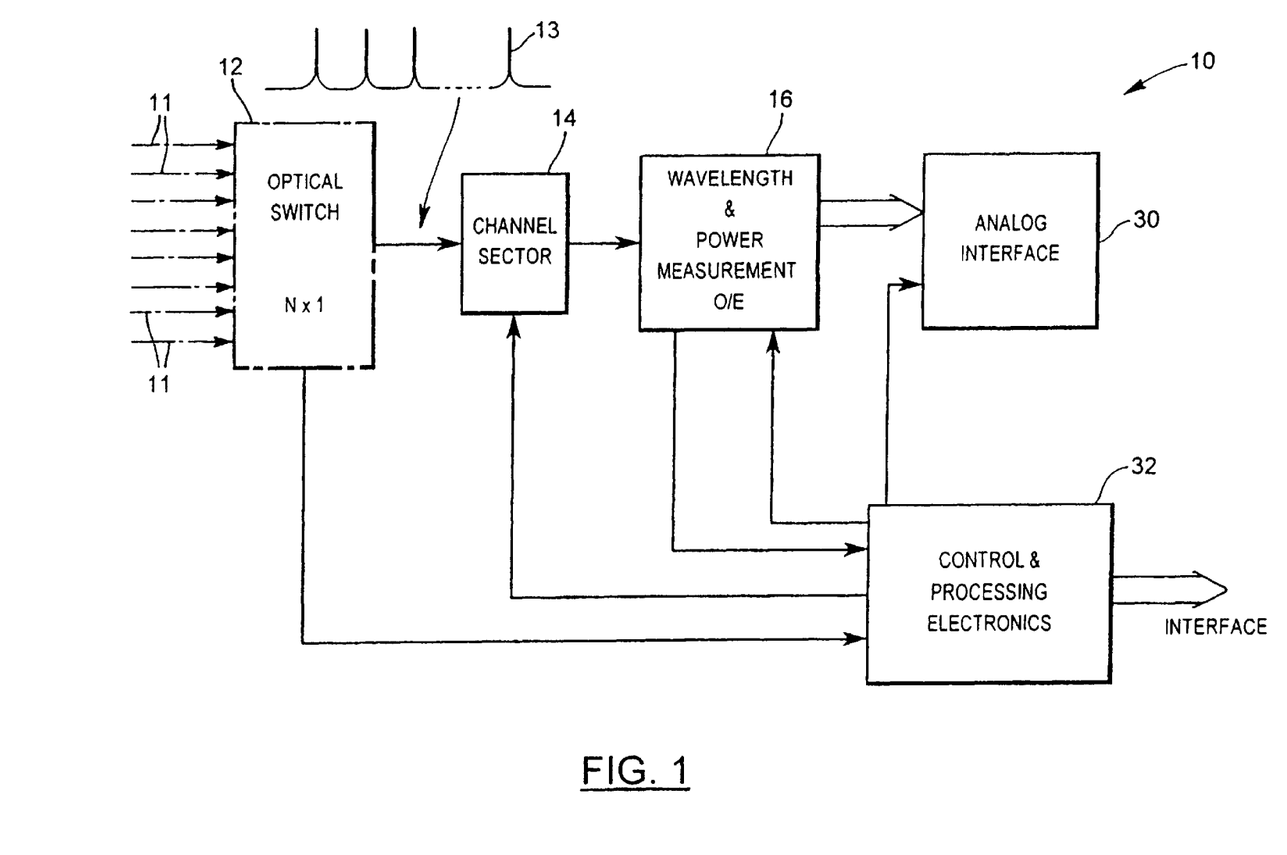
FIG. 1 is a system block diagram of the wavelength performance monitoring system of the present invention.

Referring to FIG. 1 the optical performance monitoring system of the present invention, shown generally at 10, is based on dividing the spectrally encoded optical signal into two parts and thereafter using a ratiometric wavelength and power determination system. Multiple optical fibers 11 are inputted to an optical switch 12 and the single output of switch 12 is inputted into a tunable channel selector 14 with the spectral output 13 of switch 12 shown. The output of the channel selector 14 is input into a ratiometric wavelength and power measurement system 16. A controller 32 is connected to switch 12, tunable channel selector 14, ratiometric wavelength and power detection system 16 and an analog interface 30.

Figure 2:
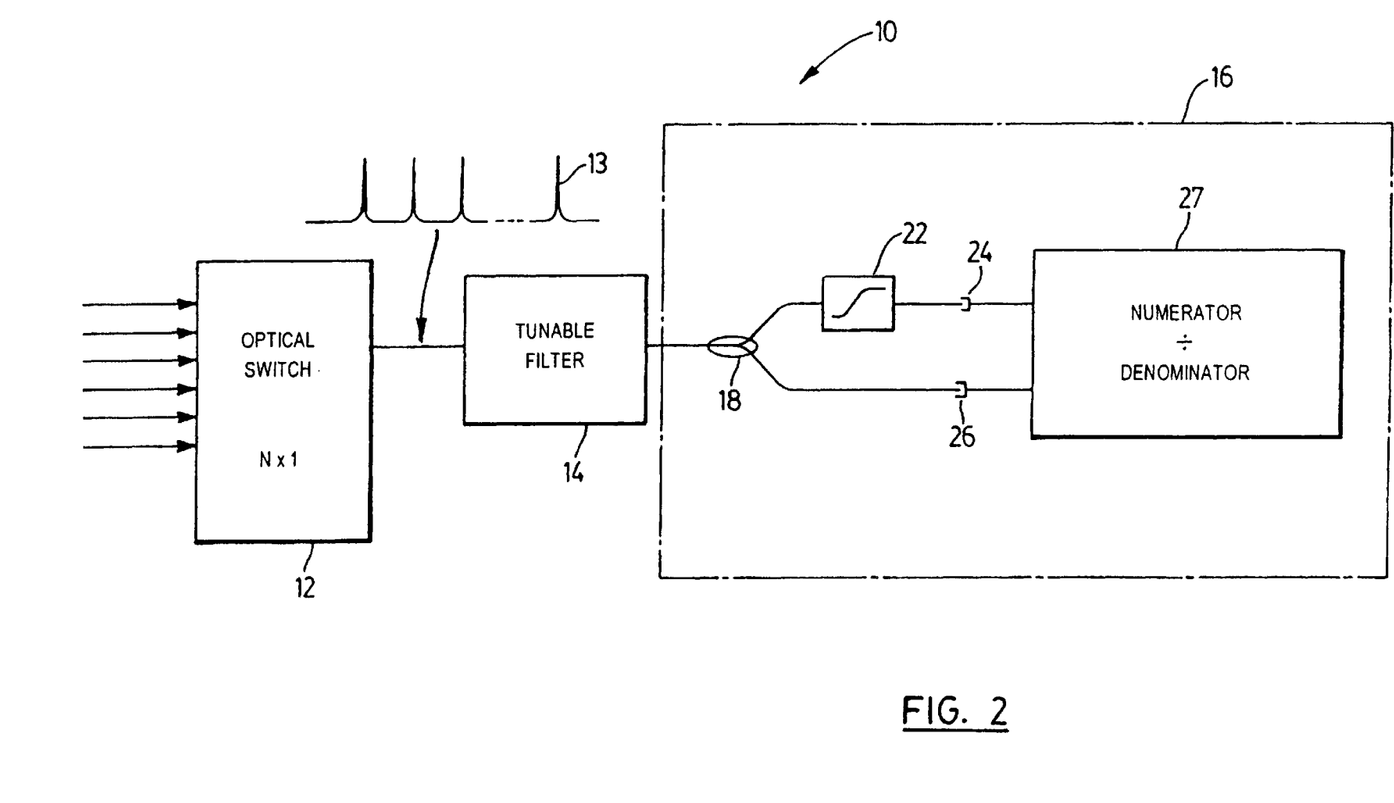
FIG. 2 is a detailed drawing of the optical circuit of the wavelength performance monitoring system of the present invention including a nx1 optical switch to accommodate several inputs.

Referring to FIG. 2, the ratiometric wavelength and power detection system 16 comprises a signal splitter 18 which splits the signal from channel selector 14 into two optical signals. One of these signals passes through an optical filter 22 with continuously increasing or decreasing transmission as a function of wavelength while the other optical signal is unperturbed. The output of filter 22 and the unperturbed signals are subsequently detected by optical electrical detectors 24 and 26 respectively where the electrical signal is proportional to the optical signal. Dividing the two signals in sub-processor 27 produces a unique ratio which is a power independent representation of the input wavelength. The present invention advantageously provides a method and device to measure simultaneously several carriers and not just one. Furthermore, in the present invention, a power measurement is obtained by using the unfiltered part of the optical signal.

In one preferred embodiment of the invention a tunable Fabry-Perot filter is used as the channel select element 14 where the control signal to tune the filter is simply scanned such that the filter tunes over the wavelength range of interest whilst the spectral data is collected. Post processing of the data by using the ratiometric wavelength determination technique reveals the accurate wavelength, power, and signal-to-noise ratio of each carrier. More specifically, the channel select filter 14 is scanned from the shortest wavelength of interest to the longest wavelength of interest and provides the adjacent channel isolation necessary for the ratiometric wavelength determination systems to measure the wavelength and the power in each step of the spectrum. In this way, the data can be post processed to reveal carriers, their wavelengths and their associated powers. Further routine calculations also provide information regarding signal-to-noise ratio which is a relative measure of the carrier strength to the background optical noise. This information can be used to further adjust overall transmission system parameters to allow for reliability and optimal performance.

In another embodiment a Bragg grating is used in a tunable configuration together with a fiber optic circulator (not shown) to form the channel select filter 14. Here the fiber Bragg grating is strain or temperature tuned over a range of wavelengths which coincide with that of the optical spectrum under test. The fiber Bragg grating is designed such that its bandwidth and isolation conform with the desired wavelength resolution and signal-to-noise ratio required for the particular application. It will also be appreciated that the tunable channel selector may be a thin film based filter, for example a semiconductor or other type of film coated on a substrate and tilted provides wavelength selectivity.

Whilst using the channel select filter 14 with its associated control signal should in theory be sufficient for identifying the spectral position of the filter and thereafter being able to reconstruct the optical spectrum, most commercially available filters have a tendency to drift and have a poor absolute accuracy of spectral position with their control signal. The ratiometric wavelength determination approach disclosed herein overcomes all the ambiguity associated with the spectral position of the channel select filter 14 in a compact and cost efficient form.

Figure 3:
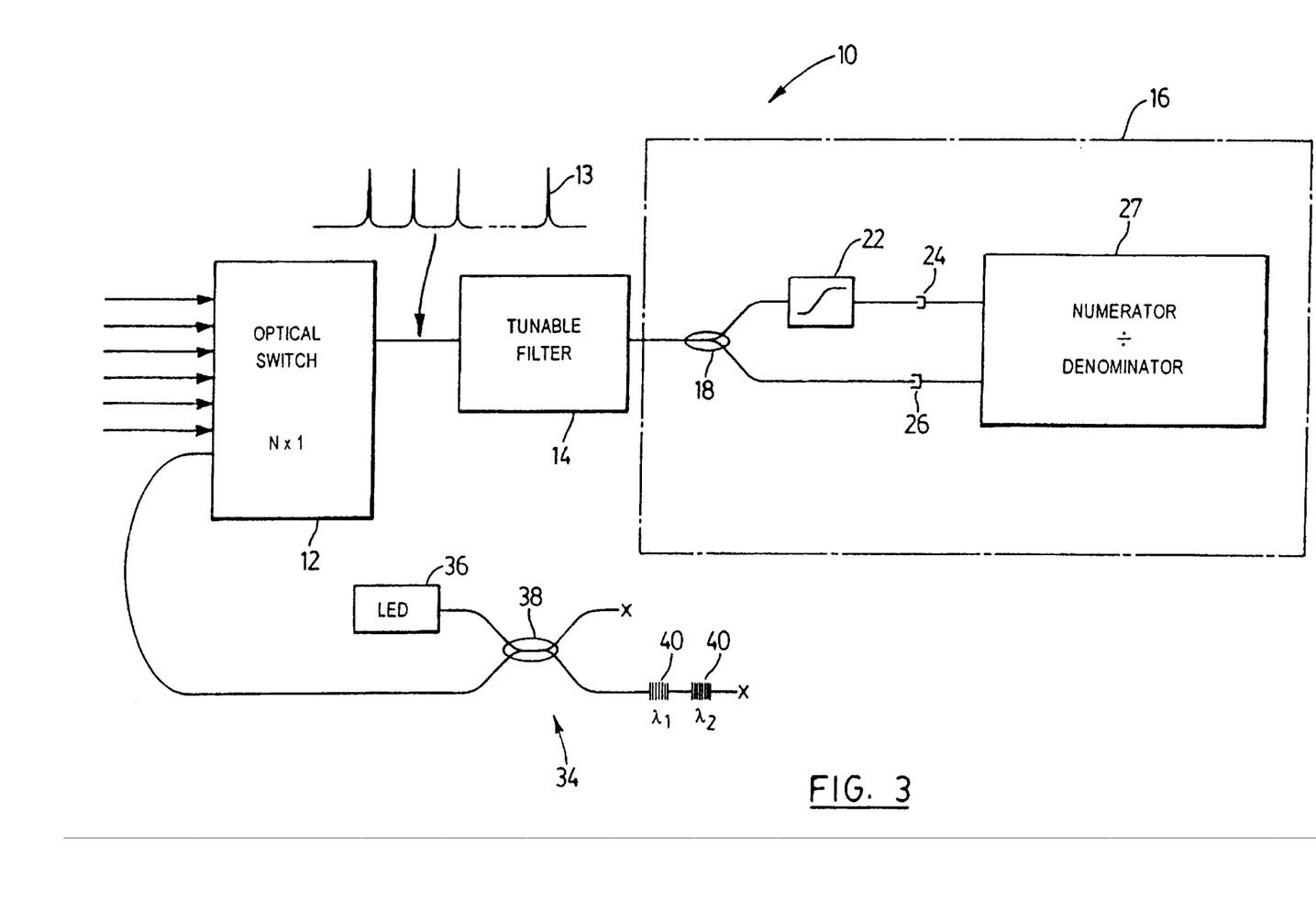
FIG. 3 is a detailed drawing of the optical circuit of an alternate embodiment of the wavelength performance monitoring system of the present invention including a method for creating two absolute wavelength reference points.

Referring to FIG. 3, in the event that either the ratiometric wavelength and power detection system 16 or the channel select filter 14 drift with time and temperature, the optical circuit 34 comprised of a light emitting diode (LED) 36, a splitter 38, and a single or multiple (as shown here) temperature stabilized gratings 40, as depicted in the Figure, can be used to establish an absolute wavelength reference. In this case, the reflections from the gratings 40 are selected by moving the optical switch 12 to the appropriate channel. This light is then passed through the remainder of the optical circuit and measured using the detectors. Upon post-processing of the signal, the relative positions of the gratings with respect to the system can be established. By establishing the absolute wavelength of the gratings a priori, the relative drift of the system with respect to wavelength may be determined and corrected in post processing. This provides an embedded calibration system without the need for making such corrections off-line.

Figure 4:
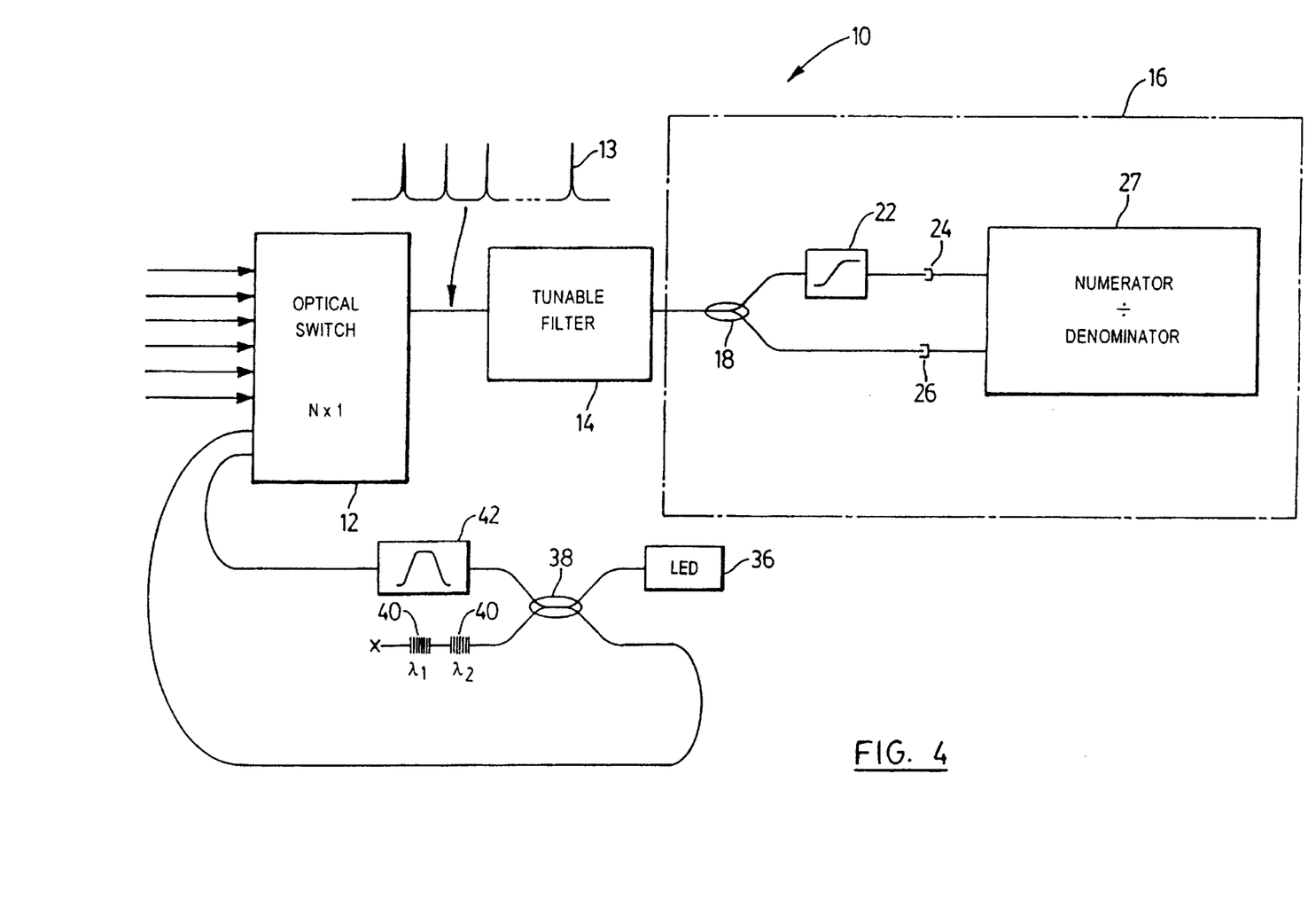
FIG. 4 is a detailed drawing of the optical circuit of an alternate embodiment of the wavelength performance monitoring system of the present invention which provides for nulling-out insertion loss variations for the nx1 switch, the tunable filter, and the wavelength and power determination system.

An alternative embodiment of an embedded self-calibration section is shown in FIG. 4 and is generally described above but the embodiment of FIG. 5 includes the addition of a bandpass filter 42 and use of the other port of the splitter 38. By connecting the output to the bandpass filter 42, power losses of the system can also be calibrated provided that both the LED 36 and the splitter 38 are stable themselves.

Figure 5:
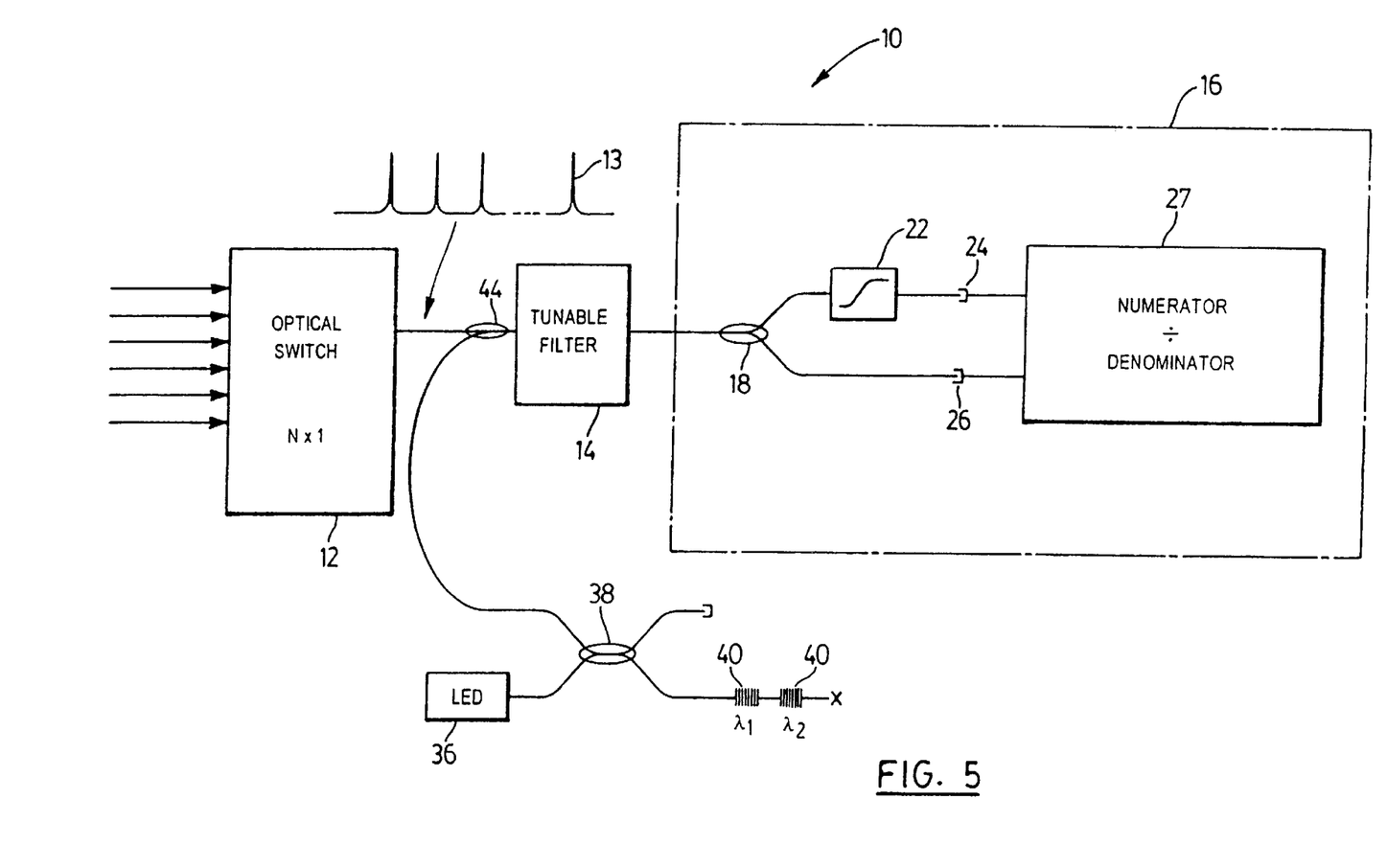
FIG. 5 is a detailed drawing of the optical circuit of an alternate embodiment of the wavelength performance monitoring system of the present invention including an absolute wavelength and power reference without the need for the optical switch.

FIG. 5 depicts a variation to the approach shown in FIG. 3 with the exception of passing the reference light through a coupler 44 located between optical switch 12 and the tunable selector 14 instead of the switch 12. This has the added benefit of having the reference light present at all times.

Figure 6:
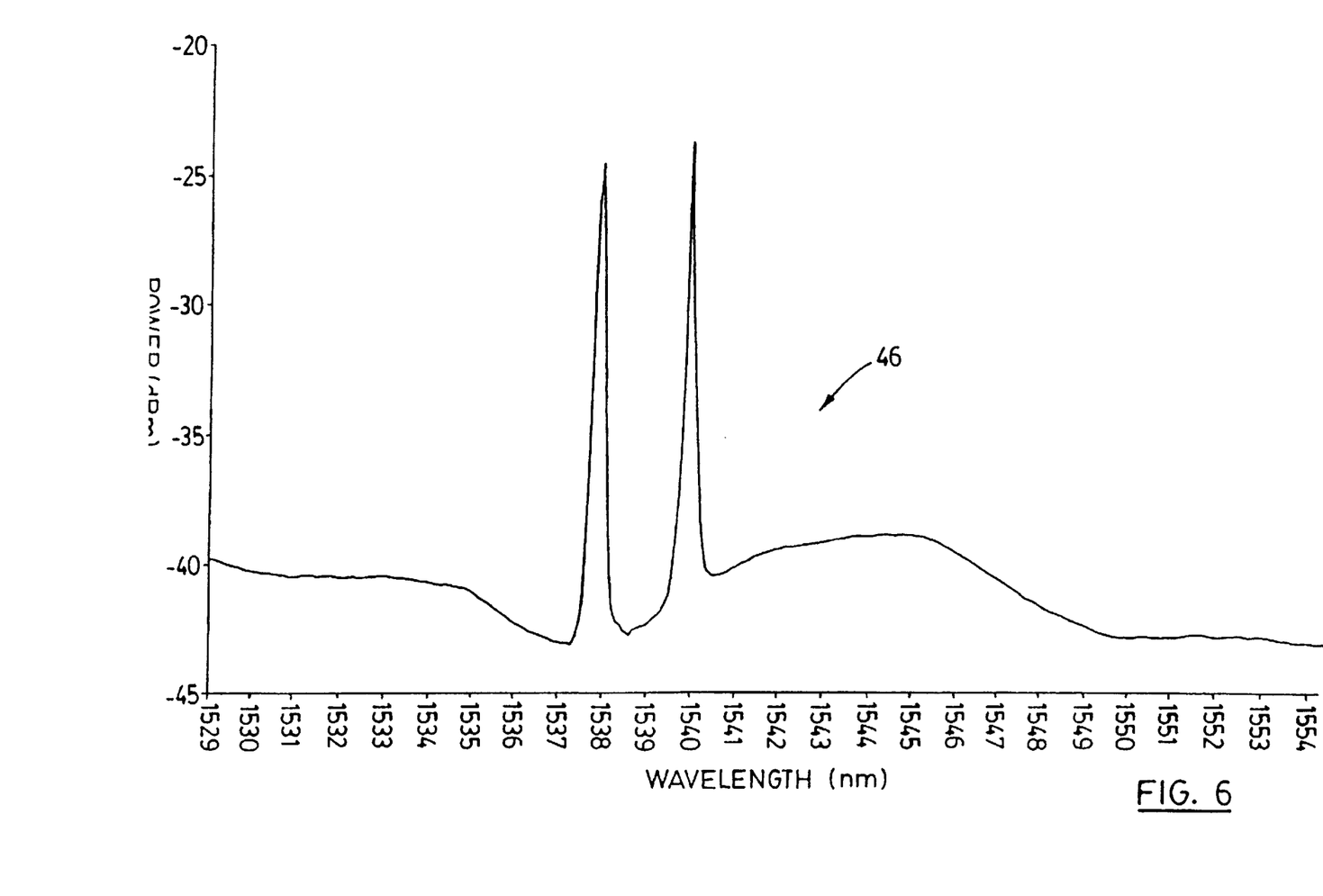
FIG. 6 is a representative output plot of the system.

Referring to FIG. 6, a representative output plot of the system is shown generally at 46 wherein wavelength is shown along the x-axis and power is shown along the y-axis.

Figure 7:
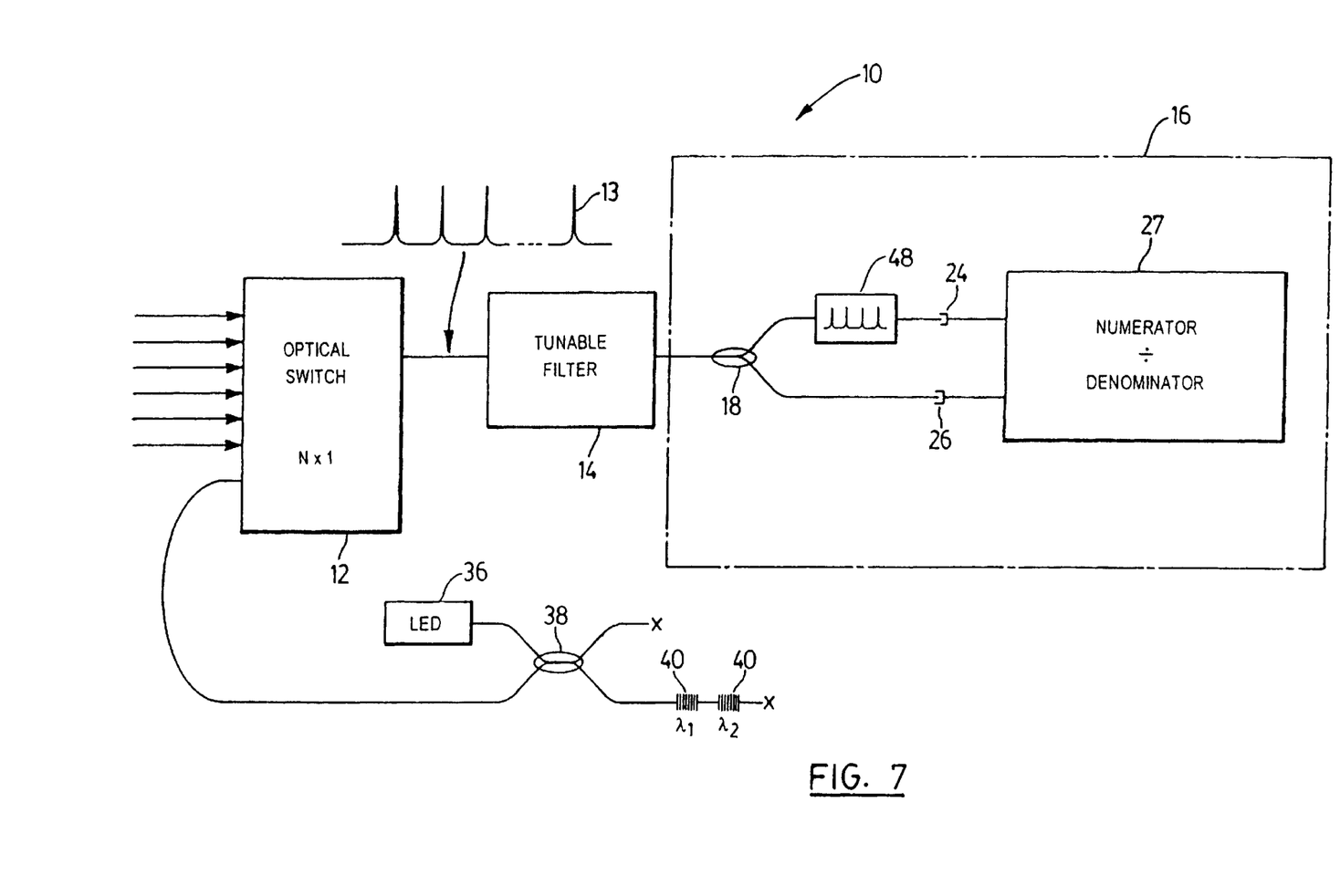
FIG. 7 is a detailed drawing of the optical circuit of an alternate embodiment of the wavelength performance monitoring system of the present invention including a period filter in the ratiometer.
Figure 8:
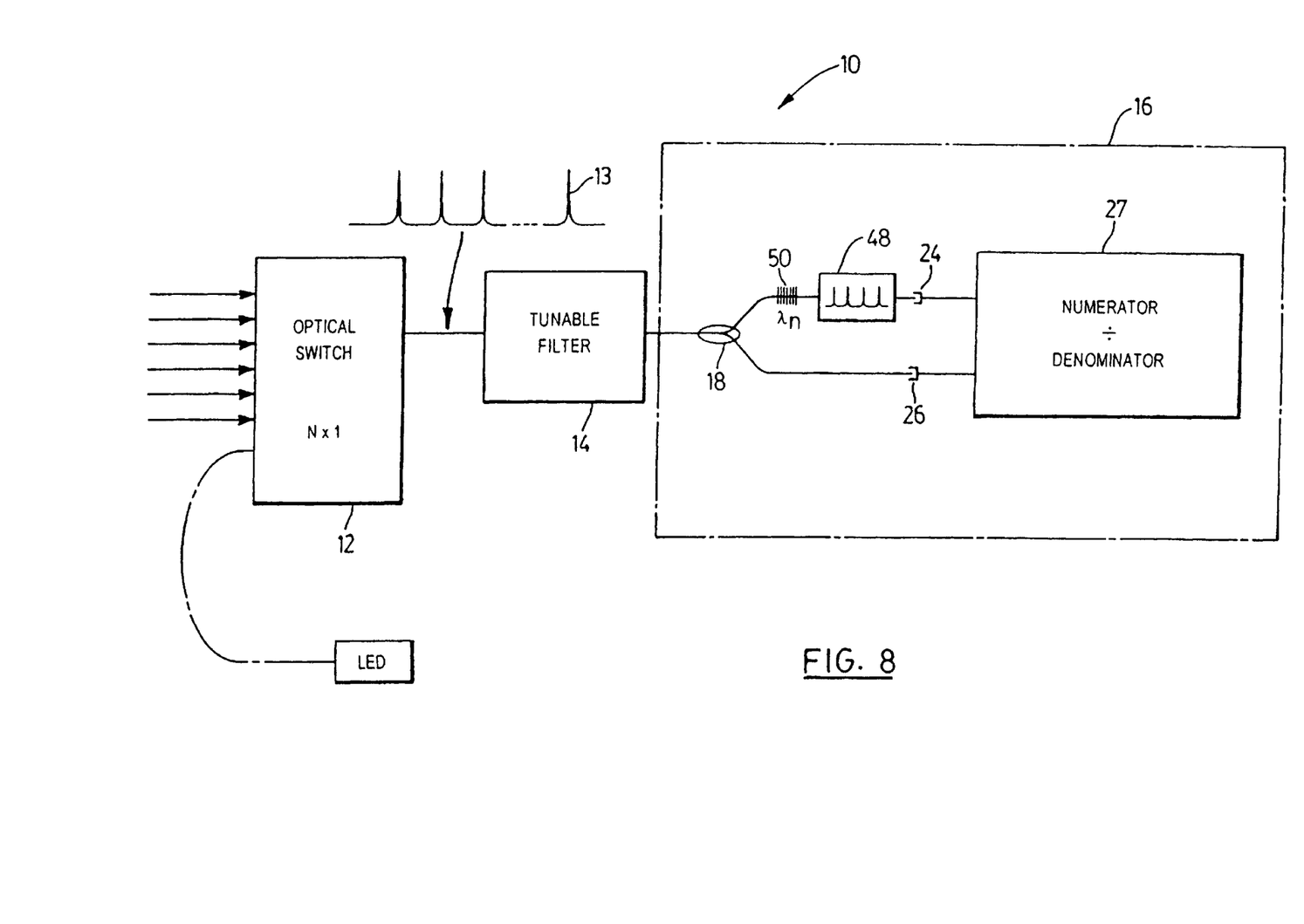
FIG. 8 is a detailed drawing of the optical circuit of an alternate embodiment of the wavelength performance monitoring system of the present invention similar to FIG. 7 but also including a Bragg grating reflector or other means of providing a wavelength reference.

In another embodiment shown in FIG. 7, the wavelength dependent filter used in the wavelength and power determination circuit 16 is a periodic filter 48. The device, for example, may be a Fabry-Perot filter with a pre-determined period so as to provide an absolute wavelength versus transmission response over a specific wavelength region. The periodicity of the filter 48 is chosen such that the output response of the filter varies monotonically with wavelength. This filter 48 has the advantage of allowing for measurement with much higher resolution. Since these filters are typically multiple-valued, a fiber Bragg grating reflector 50 (or other types of reference filters) can be used in front of the period filter 48 to provide a reference as shown in FIG. 8. Given that the filter 48 is periodic with a known period in terms of wavelength, determination of the wavelength of the input signal is made by establishing a reference and measuring the ratio which is provided by the ratiometric system.

Figure 9:
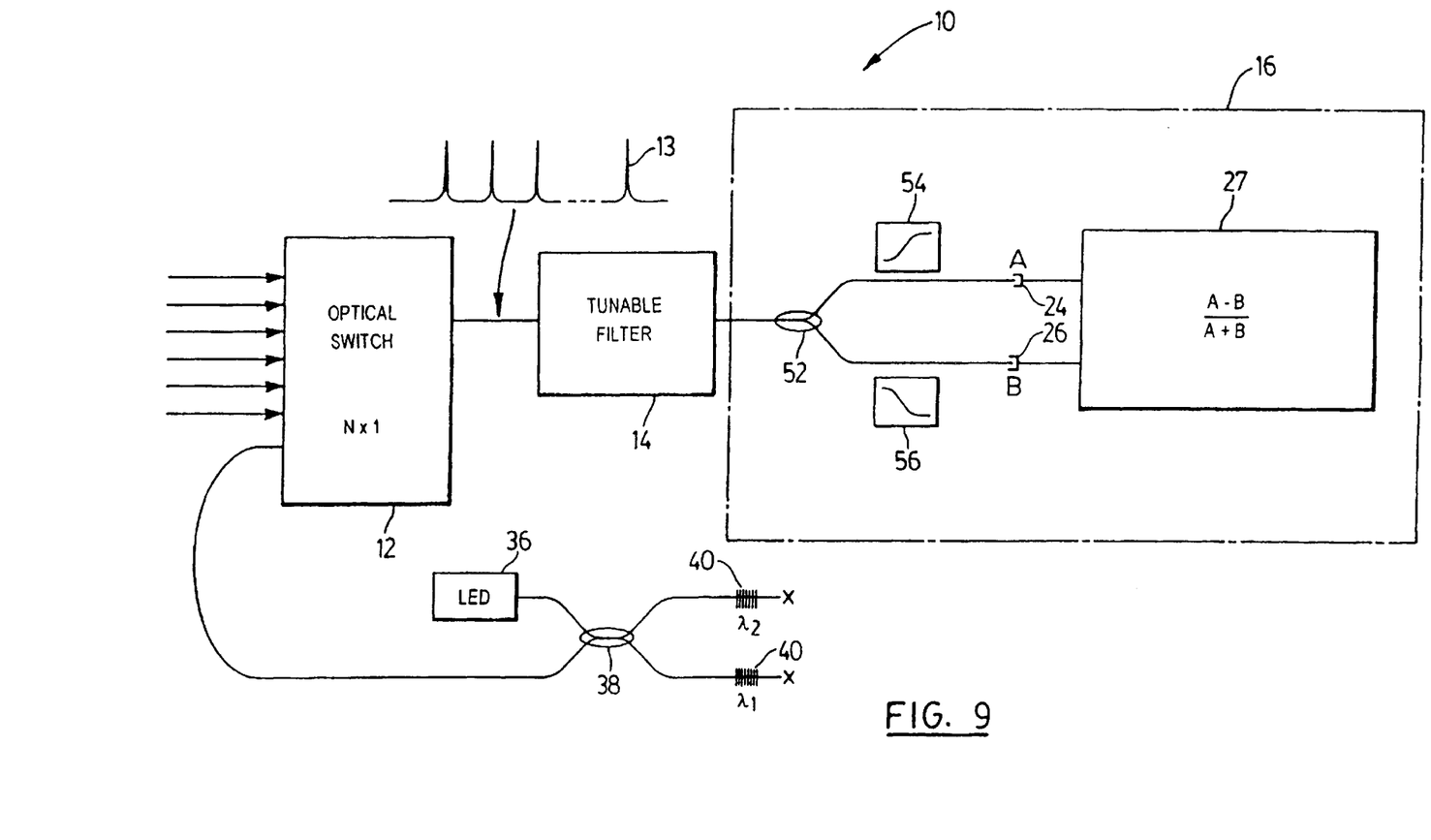
FIG. 9 is a detailed drawing of the optical circuit of an alternate embodiment of the wavelength performance monitoring system of the present invention including a wavelength dependent coupler in the ratiometer.

In another embodiment shown in FIG. 9, the output of the channel select filter 14 is passed through a wavelength dependent optical splitter 52. The coupler 52 has two outputs which are wavelength dependent and usually complimentary with each other. The wavelength dependent filter 54 in one branch has a monotonically increasing transmission response with wavelength and the other filter 56 has a monotonically decreasing response with wavelength. Subsequent detection of these outputs with appropriate photodetectors 24 and 26 permits a power independent measurement of wavelength of the incoming input signal. In addition, power measurement can also be made to reveal the signal power on a per carrier basis. This embodiment has the advantage of using fewer components and is generally more efficient in loss management. The wavelength calibration circuit includes a broadband light emitting diode (LED) coupled to splitter 38 with Bragg reflectors 40 reflecting light of wavelengths $\lambda_1$ and $\lambda_2$ which signals are coupled in splitter 38 and transmitted back to switch 12.

Figure 10:
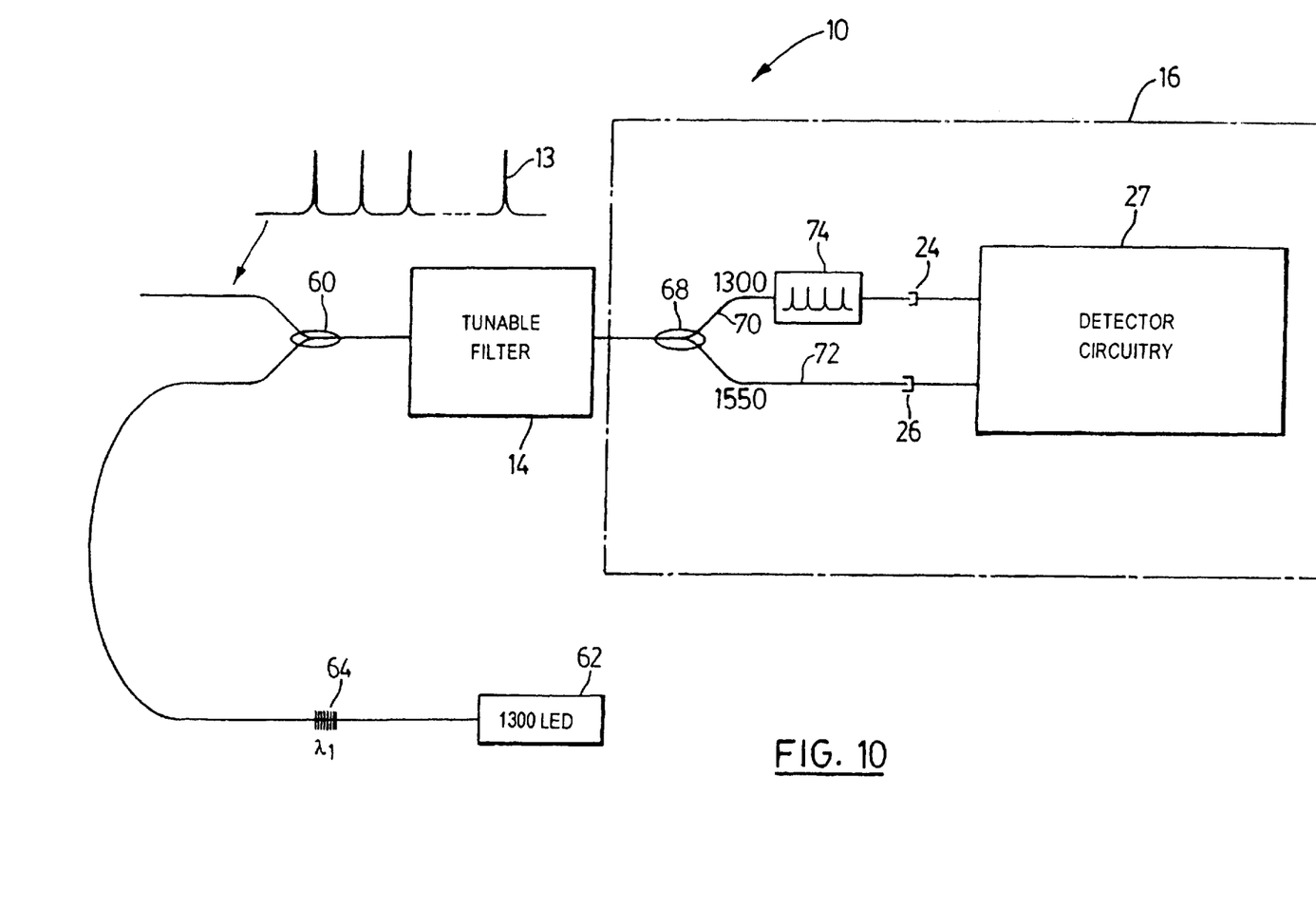
FIG. 10 is a detailed drawing of the optical circuit of an alternate embodiment of the wavelength performance monitoring system of the present invention including a wavelength division multiplexer, a reference LED light, a demultiplexer and a periodic wavelength dependent filter.

In another embodiment shown in FIG. 10 a wavelength division multiplexer 60 is placed in front of the channel select filter 14. Light from an LED 62 in the 1300 nm region is passed through a reference grating 64 to the multiplexer 60. The multiplexer 60 mixes the input signal which is in the 1550 nm region with that of the reference LED light. The input light is then selected by the channel select filter which is independently controlled by the control and processing electronics. The output of the channel select filter 14 is then passed through a demultiplexer 68 which then separates the 1300 nm band 70 and the 1550 nm band 72. The 1300 nm output of the multiplexer is subsequently passed through a periodic wavelength dependent filter 74 with a response tailored to mirror that of the desired 1500 nm response. Final measurement is made by the detectors 24 and 26 and the outputs are compared in the processor. A correlation function may be used to determine the exact wavelength of the desired 1550 nm region light by comparing the response to the 1300 nm output.

It will be appreciated by those skilled in the art that prior to the method and apparatus of the present invention a ratiometric wavelength and power detection system has not been used in a system for determining the wavelength, power, and signal-to-noise ratio measurements on a per carrier basis in a multicarrier system. Prior to the present invention ratiometric systems could not be used in a multicarrier system because the ratiometric system was unable to differentiate a carrier and thus provide useful measurements.

The foregoing description of the preferred embodiments of the invention has been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. An apparatus for analyzing an optical spectrum in wavelength division multiplexed fiber optic systems, comprising:

a tunable channel selector having an input and an output;

a ratiometric wavelength and power detection system optically connected to the output of the tunable channel selector; and, a controller connected to the tunable channel selector and the wavelength and power detection system wherein the ratiometric wavelength and power detection system includes: an optical splitter optically connected to the output of the tunable channel selector for splitting an optical signal into at least two branches; a first filter in one of the at least two branches and a first detector connected to an output of the first filter and a second detector located in the other of the at least two branches, the first and second detectors each having an output; and a divider circuit to divide the output of the one of the detectors by the output of the other detector.

2. The apparatus according to claim 1 wherein the first filter is a wavelength dependent filter.

3. The apparatus according to claim 1 wherein the first filter is a periodic wavelength dependent filter.

4. The apparatus according to claim 3 further including a Bragg grating reflector located at the input of the periodic wavelength dependent filter.

5. The apparatus according to claim 1 wherein the tunable channel selector is a Fabry-Perot filter.

6. The apparatus according to claim 1 wherein the tunable channel selector includes a tunable Bragg grating and fiber optic circulator.

7. The apparatus according to claim 6 wherein the Bragg grating is strain or temperature tunable over an effective range of wavelengths covering a wavelength range being scanned.

8. The apparatus according to claim 2 wherein the first filter is adapted to provide continuously increasing or decreasing transmission as a function of wavelength.

9. The apparatus according to claim 1 wherein the first and second detectors are photodetectors each with an electrical output signal proportional to an optical signal detected by the photodetector.

10. The apparatus according to claim 1 wherein the divider circuit divides the output of the first detector by the output of the second detector.

11. The apparatus according to claim 1 wherein the input of the tunable channel selector is connected to an output of an N×1 optical switch.

12. An apparatus for analyzing an optical spectrum in wavelength division multiplexed fiber optic systems, comprising:

a tunable channel selector having an input and an output;

a ratiometric wavelength and power detection system optically connected to the output of the tunable channel selector; and, a controller connected to the tunable channel selector and the wavelength and power detection system, wherein the input of the tunable channel selector is connected to an output of an N×1 optical switch; the apparatus further comprising an optical calibration circuit, wherein the optical calibration circuit includes an optical splitter having an input and an output and having a first branch of the output optically connected to the input to the optical switch, at least one grating located at the input to the optical splitter and a light emitting diode located at a second branch of the splitter output.

13. The apparatus according to claim 12 wherein the optical splitter has a first branch of the input and the at least one grating is located at the first branch of the input and further including a bandpass filter optically connected between the optical splitter and the input to the optical switch.

14. An apparatus for analyzing an optical spectrum in wavelength division multiplexed fiber optic systems, comprising:

a tunable channel selector having an input and an output;

a ratiometric wavelength and power detection system optically connected to the output of the tunable channel selector; and, a controller connected to the tunable channel selector and the wavelength and power detection system, wherein the input of the tunable channel selector is connected to an output of an N×1 optical switch; the apparatus further comprising an optical calibration circuit, wherein the optical calibration circuit includes a coupler located between the optical switch and the tunable filter, a splitter having an input and an output and having a first branch of the output located at the coupler, at least one grating located at the input to the optical splitter and a light emitting diode located at a second branch of the splitter output.

15. The apparatus according to claim 8 including a second wavelength dependent filter in the other of the at least two branches, wherein one of the two wavelength dependent filters provides continuously increasing transmission as a function of wavelength and the other wavelength dependent filter provides continuously decreasing transmission as a function of wavelength.

16. The apparatus according to claim 15 wherein the divider circuit subtracts the output of the second detector from the output of the first detector to produce a difference and divides this difference by a sum of the output of the first detector and the output of the second detector.

17. The apparatus according to claim 1 wherein the tunable channel selector includes a thin film based filter.

18. A ratiometric method of analyzing an optical spectrum in wavelength division multiplexed fiber optic systems, comprising:

receiving a spectrally encoded optical signal into a tunable channel selector;

dividing the spectrally encoded optical signal into at least two optical signals and passing a first optical signal through an optical filter;

detecting an output of the optical filter and converting the detected optical signal to a first electrical signal and detecting a second optical signal from the divided optical signal and converting it to a second electrical signal; and dividing one of the electrical signals by the other electrical signal to give a power independent representation of an input wavelength.

19. The method according to claim 18 further including the step of continuously increasing or decreasing transmission as a function of wavelength the signal to the optical filter.

20. The method according to claim 18 further including the step of tuning the channel selector using a control signal.

21. The method according to claim 18 wherein the first electrical signal is divided by the second electrical signal.

22. The method according to claim 18 further including the step of calibrating the system.

* * * * *